Patented Oct. 25, 1949

2,486,210

UNITED STATES PATENT OFFICE 2,486,210

PROCESS FOR PREPARING ALPHA-AMINOANTHRAQUINONES

Mario Scalera, Somerville, and Dale Raymond Eberhart, Bound Brook, N. J., assignors to American Cyanamid Company, New York, N. Y., a corporation of Maine No Drawing. Application February 5, 1947, Serial No. 726,735

5 Claims. (Cl. 260—378)

1

This invention relates to the production of alpha amino derivatives of anthraquinones from the corresponding halogen compounds.

The conversion of alpha halogen anthraquinones to alpha aminoanthraquinones may be performed by reaction with aqueous ammonia under pressure. This procedure, however, gives products of only fair purity, which are contaminated by dianthraquinonylamines and other by-products. Such products, while satisfactory for certain purposes, cannot be used as intermediates for dyestuffs of light and bright shades since the impurities always produce an undesirable dullness in the final product. Also this procedure is not applicable to those reactions where another active group, e. g. hydroxyl, is present, as such a group tends also to be replaced by the ammonia.

A better result is obtained when the alpha halogen atom is replaced by the phthalimido group by which procedure no secondary amine can be formed. In addition, this method is readily applicable to the preparation of alpha aminoanthraquinones containing other active groups. This procedure, known to the art, converts the halogen anthraquinone into a phthalimide derivative by heating with phthalimide and copper in a solvent and hydrolyzes said derivative to the corresponding aminoanthraquinone. This process in the past has given amonoanthraquinones in fair yields and superior quality to the products of direct ammonolysis. However, in this procedure certain impurities are also formed which cannot be avoided even when highly purified raw materials are used. Consequently, the aminoanthraquinones so prepared are still unsuited for the preparation of dyes of very clear shades, particularly those of yellow and red shades, because the shade of the resulting dye will be so altered as to be unacceptable to the trade.

Various methods have been tried for removing these objectionable impurities from the aminoanthraquinones. However, the results of such purifications have been very unsatisfactory. Fractional crystallization methods, for example, will not remove the impurities from the crude aminoanthraquinones without entailing too much of a loss to be practical in commercial operations. Moreover it is difficult and frequently impossible to obtain consistent results. An improvement occasionally obtained very often cannot be duplicated.

According to the present invention the formation of the undesirable impurities in the product is eliminated by carrying out the reaction in the presence of pyridine or mixed pyridine bases. The effect of the pyridine bases is quite remarkable. Not only is the quality and yield of the phthalimidoanthraquinones greatly improved, but also the reaction rate is increased and the products are in a more suitable crystalline form for washing and filtering. The purer quality of the aminoanthraquinones obtainable by the process of the present invention permits using them as intermediates for dyestuffs which have brighter shades than do those made from the less pure aminoanthraquinones produced hitherto. The impurities appear to have a very marked effect in dulling the shades of dyes.

It is an advantage of the present invention that pure phthalimide is not required and it is possible to prepare a crude phthalimide in situ by the reaction of phthalic anhydride and urea. The crude phthalimide appears to give substantially as pure a product in the present process as if pure phthalimide were employed, and of course results in a substantial saving in cost.

It is advantageous to carry out the process of the present invention in an organic solvent, and in such a case the crude phthalimide may be prepared by reacting phthalic anhydride and urea in the solvent prior to the addition of the halogenoanthraquinone, copper catalyst, pyridine bases, etc. Proper temperature control should be maintained, which is a simple matter by selection of the organic solvent. After the reaction is complete the phthalimidoanthraquinone is separated and hydrolyzed by suitable means, e. g. with strong alkalies or with acids, as is well known in the art. We prefer hydrolysis with sulfuric acid.

It is an advantage of the present invention that the pyridine need not be pure pyridine. On the contrary, any of the pyridine bases, such as picolines, lutidines, collidines, and the like, may be used separately or in mixtures, as can quinoline and its homologues. In general the higher boiling pyridine homologues are more effective than the lower boiling bases which tend to boil off at the high temperature normally employed in the reaction. They are therefore preferred. In the specification and the claims pyridine, pyridine homologues, quinoline and quinoline homologues will be referred to generally as liquid monazine bases, and this term will be used in no other sense.

The liquid monazine bases need not be pure and commercial mixtures obtained by the destructive distillation of natural products are entirely satisfactory. The possibility of using crude commercial mixtures is a definite advantage of the present invention, as the cost is materially reduced. It is also an advantage that the amounts of liquid monazine bases are not critical and do not introduce any problem in extremely accurate control. Although the amounts may vary widely, it should be understood that the monazine bases do not appear to act as catalysts because very small amounts which could be considered as catalytic amounts do not result in the improvements of the present invention. On the contrary, it is necessary to use amounts substantially in excess of catalytic amounts, although in general the amounts may be less than the stoichiometric equivalents based on the other reactants.

The actual mechanism of the beneficial action of the monazine bases is not known and it is not intended to limit the invention by any theory of action. Certain facts, however, are observed which lead to the possibility that the beneficial action of the monazine bases may be due to their effect on the copper catalyst. It is noted that in the process of the present invention at least a part of the copper catalyst appears to dissolve in the solvent and this may well be a factor in the improved results.

While it is possible to carry out the process of the present invention with monazine bases as the only strongly basic constituents of the reaction mixture, we prefer to add additional acid binding agents to react with the hydrochloric acid which is produced in the reaction. These acid binding agents may be of various types. Best results have been found when sodium acetate is used, preferably in the form of anhydrous fine powder. Other acid binding agents such as other alkali metal acetates, alkali metal carbonates, and the like, may be used. The results, however, are best with acetates.

The cupriferous catalyst may be of various forms. Copper powder behaves very satisfactorily in the process and salts such as copper acetate, cuprous chloride and the like are also very effective. Very effective catalytic action can be obtained by the use of copper salts partially or totally dissolved in the monazine bases. In general, the presence of the liquid monazine bases which are the characteristic of the present invention does not require the use of different cupriferous catalysts than those which have been used previously.

For the purposes of describing this invention, the term "reactive alpha halogen" is employed throughout to mean a chlorine or bromine atom attached to the alpha position of anthraquinone. The fluorine derivatives are not included within the scope of this term.

The process is applicable to a wide variety of reactive alpha halogen derivatives such as alpha chloroanthraquinone, alpha bromoanthraquinone, 1,4-dichloroanthraquinone, 1,5-dichloroanthraquinone, and 1,4,5,8-tetrachloroanthraquinone. In these compounds, the reactive halogen atoms are replaceable by phthalimido groups by the present process.

Also suitable for the process are alpha halogen anthraquinones which are substituted by other reactive univalent substituents such as hydroxy, nitro, benzoylamino, and the like. Such compounds include 1-chloro-4-hydroxyanthraquinone, 1-chloro-4-nitroanthraquinone, 1-chloro-5-nitroanthraquinone, 1-chloro-4-benzoylaminoanthraquinone, 1-chloro-5-benzoylaminoanthraquinone, 1,3-dichloroanthraquinone, 1,6-dichloroanthraquinone, 1,3-dibromoanthraquinone, and 1,6-dibromoanthraquinone. When compounds containing both alpha and beta halogen atoms are used in the present process, only the alpha halogen atoms are replaced by phthalimido groups, the beta halogens remaining unchanged throughout the reaction.

Various organic solvents may be used in the reaction medium. In general it is necessary that they be inert and boil sufficiently high, above 150° C., so that the temperatures for best reaction can be maintained. The nitrated mono-nuclear aromatic hydrocarbons are the best solvents. Nitrobenzene is the cheapest and therefore economically preferable, but its homologues, such as nitrotoluene, nitrated xylenes, and the like are equally useful. Other inert solvents such as orthodichlorbenzene, trichlorbenzene and the like may be used. It is an advantage of the invention that the amount of solvent is not critical. Enough should be used so that a reaction mixture of satisfactory stirrable consistency is obtained, and typical amounts will be described in the specific examples below. Somewhat larger amounts of solvent may be used without serious harm, but very large excesses should be avoided because while they do not affect the reaction adversely, the phthalimidoanthraquinones obtained as end products show some solubility in the solvents and the use of excessive amounts will therefore result in losses and hence lower yields.

In order to obtain optimum yields and quality of the aminoanthraquinones it is desirable to keep the temperature at or slightly above 190° C. during the vigorous reaction of the halogenoanthraquinones with the phthalimide. The process proceeds at somewhat lower temperatures but best results are obtained between 190–195° C., the efficiency of the process falling off somewhat when temperatures materially exceed 200° C. It is one of the marked advantages of the present invention that the phthalimidoanthraquinones obtained are coarse and quick settling, which permits easy and rapid filtration and washing.

The hydrolysis of the phthalimidoanthraquinones is most easily accomplished by heating in concentrated sulfuric acid at elevated temperature such as 70–100° C. In some cases better results are obtained, particularly as to purity, if the concentrated sulfuric acid remaining after heating, is first diluted to 65–70% acid concentration and finally drowned in ice. The aminoanthraquinones thus obtained are filtered and washed until acid free.

The invention will be illustrated in greater detail in conjunction with the following specific examples which are typical. The parts are by weight. The high boiling pyridine bases employed are a commercial mixture having a boiling range of 130–160° C. with the major portion boiling at 143° C. This is composed principally of pyridine homologues, e. g., the beta- and gamma - picolines and 2,6-lutidine. Small amounts of collidines are also present.

EXAMPLE 1

*1-aminoanthraquinone*

To a stirred mixture of 98 parts of phthalimide, 138 parts of 1-chloroanthraquinone, 1.4 parts of copper powder and 347 parts of nitrobenzene heated to 190° C. are added 51 parts of pyridine bases, and, after the temperature has reached 195° C., 56 parts of anhydrous sodium acetate. A vigorous reaction occurs when the temperature has reached about 200° C. The reaction mixture is stirred and this temperature maintained for ½ hour. The mixture is then cooled and the fluid suspension filtered. The cake is washed with nitrobenzene until it is a bright green-yellow color and the nitrobenzene removed either by steaming or by alcohol washing, followed by water washing. After drying, the 1-phthalimidoanthraquinone is obtained in nearly theoretical yield and excellent purity. Hydrolysis in the usual way with sulfuric acid yields 1-aminoanthraquinone in pure form and quantitative yield.

In the above example, cuprous chloride or copper acetate may be substituted for copper powder.

The phthalimide for the above reaction may be prepared in situ by heating 99 parts of phthalic anhydride, 20 parts of urea and 347 parts of mononitrobenzene slowly to 190° C.

When the above example is followed except for the omission of the pyridine bases, the 1-phthalimidoanthraquinone obtained has a tan color and is of lower purity than that obtained by the improved method described above. The 1-aminoanthraquinone produced from the old process without the use of pyridine bases is of lower purity and when used for preparation of pure yellow dyes, it produces redder and duller shades than does the 1-aminoanthraquinone produced as described above.

EXAMPLE 2

1-aminoanthraquinone

A stirred mixture of 39.4 parts of phthalimide, 55.2 parts of alpha chloroanthraquinone, and 138 parts of nitrobenzene is heated to about 180° C. and there are added 22.3 parts of anhydrous sodium acetate and about 11 parts of pyridine bases. The mixture is heated to 195° C. and there is added 0.8 part of cuprous chloride partially dissolved in 11 parts of pyridine bases. The reaction mixture is heated rapidly to 200° C. This temperature is maintained until the reaction is complete. The reaction mixture is cooled and filtered. The filter cake is washed with nitrobenzene until the washings are clear yellow and the nitrobenzene removed either by steaming or by alcohol washing, followed by water washing. After drying, there is obtained an excellent yield of a green-yellow 1-phthalimidoanthraquinone of very high purity which can be hydrolyzed in the usual way to give 1-aminoanthraquinone in pure form and quantitative yield.

EXAMPLE 3

1,8-diaminoanthraquinone

A mixture of 41.6 parts of 1,8-dichloroanthraquinone, 52.7 parts of phthalimide, 29.6 parts of anhydrous sodium acetate, and 92 parts of nitrobenzene is heated, with stirring, to 180° C. There are then added 0.72 part of copper powder and 27 parts of pyridine bases. The reaction mixture is heated to 200° C. and stirred for one hour at this temperature. The mixture is cooled, filtered, and the cake washed with nitrobenzene until the washings are a clean yellow color. The cake is then washed with alcohol and finally with hot water. The pale yellow diphthalimidoanthraquinone is obtained in quantitative yield and very good quality and can be hydrolyzed in the usual way with sulfuric acid to 1,8-diaminoanthraquinone.

EXAMPLE 4

1,4,5,8-tetra-aminoanthraquinone

To a stirred mixture of 17.3 parts of 1,4,5,8-tetrachloroanthraquinone, 34.2 parts of phthalimide, 0.68 part of copper powder, and 65 parts parts of nitrobenzene heated to 190° C., 9 parts of pyridine bases are added, followed by 19.7 parts of anhydrous sodium acetate. The mixture is heated rapidly to 200° C. and stirred for one hour at this temperature, after which time it is cooled and filtered. The cake is washed with nitrobenzene, alcohol, and hot water and dried. A nearly quantitative yield of light-colored tetraphthalimidoanthraquinone is obtained which can be hydrolyzed by the usual procedure to 1,4,5,8-tetra-aminoanthraquinone.

EXAMPLE 5

1-amino-4-hydroxyanthraquinone 258 parts of 1-chloro-4-hydroxyanthraquinone, 170 parts of phthalimide, 0.6 part of copper powder, and 90 parts of pyridine bases are added to 1000 parts of nitrobenzene. The resulting mixture is heated to 190° C.–200° C., and 98 parts of anhydrous sodium acetate are added. A vigorous reaction occurs, and acetic acid and other volatiles distill from the reaction mixture. The mixture is maintained at 200° C. for about two hours, and is then cooled and filtered. The cake is washed with nitrobenzene until free of the dark mother liquor, then washed with alcohol, water, and dried.

The 1-phthalimido-4-hydroxyanthraquinone is obtained in excellent yield and purity. It can be hydrolyzed quantitatively by heating in 10 parts of 98% sulfuric acid at 80° C. for one hour. The 1-amino-4-hydroxyanthraquinone so obtained is of very high purity.

Similar results are obtained when the phthalimide for the above reaction is prepared by heating 38 parts of urea and 185 parts of phthalic anhydride in 1000 parts of nitrobenzene, up to 190° C., and adding the 1-chloro-4-hydroxyanthraquinone, copper, pyridine bases and sodium acetate to the solution so obtained, in the proportions and the manner described above.

EXAMPLE 6

1-amino-3-choloroanthraquinone

A mixture of 20.3 parts of phthalimide, 0.4 part of copper powder, 1 part glacial acetic acid, and 48 parts of nitrobenzene is heated slowly to about 160° C. and there are aded 32.9 parts of 1,3-dichloroanthraquinone and 48 parts of nitrobenzene. The temperature is then raised rapidly to about 200° C. There are added 12 parts of anhydrous sodium acetate and 11 parts pyridine bases. Vigorous reflux is maintained until the reaction is complete. The reaction mixture is then cooled and filtered. The filter cake is washed with nitrobenzene and the nitrobenzene removed by steam stripping or by alcohol washing, followed by water washing. After drying there is obtained a good yield of 1-phthalimido-3-chloroanthraquinone. This can be hydrolyzed by the usual method to give a high yield of 1-amino-3-chloroanthraquinone.

In all the examples described, the corresponding bromo derivatives may be substituted for the chloro derivatives. However, it is preferred to use the chloro compounds because they are relatively less expensive and more readily available.

We claim:
1. In the process for the production of an alpha-amino-anthraquinone by reacting phthalimide with a reactive alpha halogeno anthraquinone, the halogen having an atomic weight of at least 35 and not more than 80, in an inert organic solvent and in the presence of a cupriferous catalyst, followed by hydrolysing the phthalimido anthraquinone so formed, the improvement which comprises carrying out the reaction of the imide and the alpha halogeno anthraquinone at a temperature of 150 to 200° C. and in the presence of at least approximately 20% by weight of the alpha halogeno anthraquinone of a liquid basic material selected from the group consisting of pyridine, homologues of pyridine, quinoline, homologues of quinoline, and mixtures thereof.

2. In the process for the production of an alpha aminoanthraquinone by reacting phthalimide with a reactive alpha halogeno anthraquinone, the halogen having an atomic weight of at least 35 and not more than 80, in an inert organic solvent and in the presence of a cupriferous catalyst, and an acid binding agent, followed by hydrolysing the phthalimido anthraquinone so formed, the improvement which comprises carrying out the reaction of the imide and the alpha halogeno anthraquinone at a temperature of 150 to 200° C. and in the presence of at least approximately 20% by weight of the alpha halogeno anthraquinone of a liquid basic material selected from the group consisting of pyridine, homologues of pyridine, quinoline, homologues of quinoline, and mixtures thereof.

3. A process according to claim 2 in which the halogen anthraquinone is 1-chloroanthraquinone.

4. A process according to claim 2 in which the halogen anthraquinone is 1-chloro-4-hydroxy anthraquinone.

5. A process according to claim 2 in which the halogen anthraquinone is 1,4,5,8-tetrachloroanthraquinone.

MARIO SCALERA.
DALE RAYMOND EBERHART.

REFERENCES CITED

The following references are of record in the file of this patent:

UNITED STATES PATENTS

| Number | Name | Date |
| --- | --- | --- |
| 1,528,470 | Drescher et al. | Mar. 3, 1925 |
| 1,821,043 | Weinand | Sept. 1, 1931 |
| 1,867,057 | Buchloh et al. | July 12, 1932 |
| 1,898,750 | Thomson | Feb. 21, 1933 |
| 2,235,570 | Bludow | Mar. 18, 1941 |